(12) United States Patent
Penny

(10) Patent No.: US 8,413,829 B2
(45) Date of Patent: *Apr. 9, 2013

(54) BLOW-MOLDED CONTAINER HAVING FINISH WITH THREAD GROOVE AND TAMPER EVIDENT FEATURES

(75) Inventor: Michael E. Penny, Saline, MI (US)

(73) Assignee: Amcor Limited, Abbotsford, Victoria (AU)

( * ) Notice: Subject to any disclaimer, the term of this patent is extended or adjusted under 35 U.S.C. 154(b) by 372 days.

This patent is subject to a terminal disclaimer.

(21) Appl. No.: 12/690,556

(22) Filed: Jan. 20, 2010

(65) Prior Publication Data

US 2010/0270256 A1    Oct. 28, 2010

Related U.S. Application Data

(63) Continuation-in-part of application No. 11/657,971, filed on Jan. 25, 2007, now Pat. No. 7,918,355, and a continuation-in-part of application No. 11/698,009, filed on Jan. 25, 2007, now Pat. No. 7,918, 356.

(60) Provisional application No. 60/763,203, filed on Jan. 27, 2006.

(51) Int. Cl.
*B65D 1/02* (2006.01)
*B65D 39/00* (2006.01)

(52) U.S. Cl. .......................... 215/44; 215/329

(58) Field of Classification Search ............... 215/42, 215/44, 40, 43, 45, 329; 220/288; 428/542.8
See application file for complete search history.

(56) References Cited

U.S. PATENT DOCUMENTS

| | | | |
|---|---|---|---|
| 3,497,096 | A | 2/1970 | Smith et al. |
| 3,757,487 | A | 9/1973 | Fauth |
| 4,005,799 | A | 2/1977 | Mannaerts |
| 4,257,526 | A | 3/1981 | Weits et al. |
| 4,373,641 | A | 2/1983 | Banich et al. |
| 4,730,747 | A | 3/1988 | Schiemann |
| 4,895,265 | A | 1/1990 | Luch et al. |
| 4,896,782 | A | 1/1990 | Hawkins et al. |
| 4,993,571 | A | 2/1991 | Conti |

(Continued)

FOREIGN PATENT DOCUMENTS

| | | |
|---|---|---|
| DE | 3916797 | 12/1989 |
| FR | 2631932 | 12/1989 |

(Continued)

OTHER PUBLICATIONS

English translation of Office Action dated Nov. 25, 2011 in corresponding Japanese Patent Application No. 2008-552418 (five pages).

(Continued)

*Primary Examiner* — Sue Weaver

(57) ABSTRACT

A blow-molded plastic container includes an upper portion having a finish, a body portion and a base. At least one groove is formed in a radial sidewall of the finish. The groove slopes gradually downward along the radial sidewall and away from an opening into the container. The container may also include a kick out feature engagable with a tamper-evidence band. A closure member is adapted to selectively mate with the finish on the container. At least one thread is formed on the closure member.

19 Claims, 6 Drawing Sheets

U.S. PATENT DOCUMENTS

| | | | | |
|---|---|---|---|---|
| 5,213,224 | A | * | 5/1993 | Luch ............................ 215/256 |
| 5,533,633 | A | | 7/1996 | King |
| 5,702,014 | A | | 12/1997 | Nielsen |
| 5,845,798 | A | | 12/1998 | Carrier |
| 6,105,802 | A | * | 8/2000 | French et al. ................. 215/318 |
| 6,408,532 | B1 | * | 6/2002 | Keys et al. ...................... 33/833 |
| 6,415,935 | B1 | | 7/2002 | Hins |
| 6,471,909 | B1 | | 10/2002 | Czesak |
| 6,561,369 | B1 | | 5/2003 | Clodfelter et al. |
| 6,841,117 | B1 | | 1/2005 | Smith et al. |
| 6,989,124 | B2 | | 1/2006 | Miller et al. |
| 7,207,451 | B2 | | 4/2007 | Taylor et al. |
| 7,455,914 | B2 | | 11/2008 | Bromley et al. |
| 7,531,125 | B2 | | 5/2009 | Dygert |
| 7,735,664 | B1 | * | 6/2010 | Peters et al. .................... 215/44 |
| 7,918,355 | B2 | * | 4/2011 | Penny ............................. 215/44 |
| 7,918,356 | B2 | * | 4/2011 | Penny ............................. 215/44 |
| 2005/0205575 | A1 | | 9/2005 | Kobayashi et al. |
| 2007/0175854 | A1 | | 8/2007 | Penny |
| 2007/0175855 | A1 | | 8/2007 | Penny |

FOREIGN PATENT DOCUMENTS

| | | |
|---|---|---|
| JP | 11-222217 | 8/1999 |
| JP | 2000-326998 | 11/2000 |
| JP | 2003-339822 | 12/2003 |
| JP | 2004-035036 | 2/2004 |
| JP | 2005-001677 | 1/2005 |
| JP | 2005-170475 | 6/2005 |
| JP | 2005-212872 | 8/2005 |
| WO | WO 9100220 | 1/1991 |
| WO | WO 9422734 | 10/1994 |
| WO | WO 03057583 | 7/2003 |
| WO | WO 2004041669 | 5/2004 |
| WO | WO 2005097610 | 10/2005 |
| WO | WO 2007089552 | 8/2007 |
| WO | WO 2007089566 | 8/2007 |

OTHER PUBLICATIONS

Official Action dated Jun. 29, 2012 in corresponding Japanese Patent Application No. 2008-552418 and English translation of same (eight pages).

* cited by examiner

BLOW-MOLDED CONTAINER HAVING FINISH WITH THREAD GROOVE AND TAMPER EVIDENT FEATURES

CROSS-REFERENCE TO RELATED APPLICATIONS

This application is a continuation-in-part of U.S. patent application Ser. No. 11/657,971 filed on Jan. 25, 2007, now U.S. Pat. No. 7,918,355, issued Apr. 5, 2011, and a continuation-in-part of U.S. patent application Ser. No. 11/698,009 filed Jan. 25, 2007, now U.S. Pat. No. 7,918,356, issued Apr. 5, 2011. U.S. patent application Ser. No. 11/657,971 and U.S. patent application Ser. No. 11/698,009 each claims a benefit of U.S. Provisional Application No. 60/763,203 filed on Jan. 27, 2006. The entire disclosures of each of the above applications are incorporated herein by reference.

FIELD

This disclosure generally relates to containers for retaining a commodity, such as a solid or liquid commodity. More specifically, this disclosure relates to a blown polyethylene terephthalate (PET) container having a blown container finish including a groove formed in the molded surface where threads of a given closure will ride during capping.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume faction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

In many applications, it is desirable to provide a closure or cap for mating with a finish of a container. Many such container and cap combinations are designed with a tamper-evidence (TE) breakaway band on the cap. Such a band is attached to the cap when initially applied to the corresponding container finish and upon opening the container for the first time, the band is designed to break away from the cap and remain on the container. Since the band can only break away one time, the resulting effect proves whether or not the container has been tampered with, or more specifically, if the cap has been removed prior to the actual end user opening the container.

In addition, an improved blown definition may be achieved around a finish of the blown finish type having a debossed (grooved) threaded profile as compared to a conventional embossed (raised) threaded profile. Explained further, during the forming of a PET container with a blown finish, tighter, more functional radii may be created when the material is blown against more defined mold features (i.e. debossed threaded profile) versus blowing the material against milled out mold features (i.e. embossed threaded profile).

Within the realms of the PET blow molding industry, where it is desirable to convert injection molded PET preforms into blow molded PET containers, it has been shown that any blow moldable detail that is designed and built into any given blow mold, be sized in such a way that ensures duplication of that mold detail onto the moldable surface of the resultant container. The inherent nature of PET causes the molded container to become stiffer as it biaxially orientates. As a result, it is important to define any embossed detail as having a height dimension (i.e. in a direction along the axis of the container) to be sufficiently greater than a depth dimension (i.e. in a direction generally transverse to the axis of the container).

SUMMARY

This section provides a general summary of the disclosure, and is not a comprehensive disclosure of its full scope or all of its features.

Accordingly, the present disclosure provides a blow-molded plastic container and method for making the same. The blow-molded plastic container includes an upper portion, a body portion and a base. At least one groove is formed in a radial sidewall of the upper portion. The groove slopes gradually downward along the radial sidewall and away from an opening into the container. The container may also include a kick out feature engagable with a tamper-evident band.

A method of making a blow-molded container includes disposing a preform into a mold cavity having a surface defining a body forming region, a finish forming region and a moil forming region. The preform is blown against the mold surface to form an intermediate container having a body portion, a finish and a moil portion. The finish defines at least one groove. The moil is severed from the finish to define an opening into the container.

A closure member is adapted to selectively mate with a finish on the container. The closure member includes a lower portion defining an opening and an upper portion defining a cover. At least one thread is formed on an inner surface of a radial sidewall extending between the lower portion and the upper portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
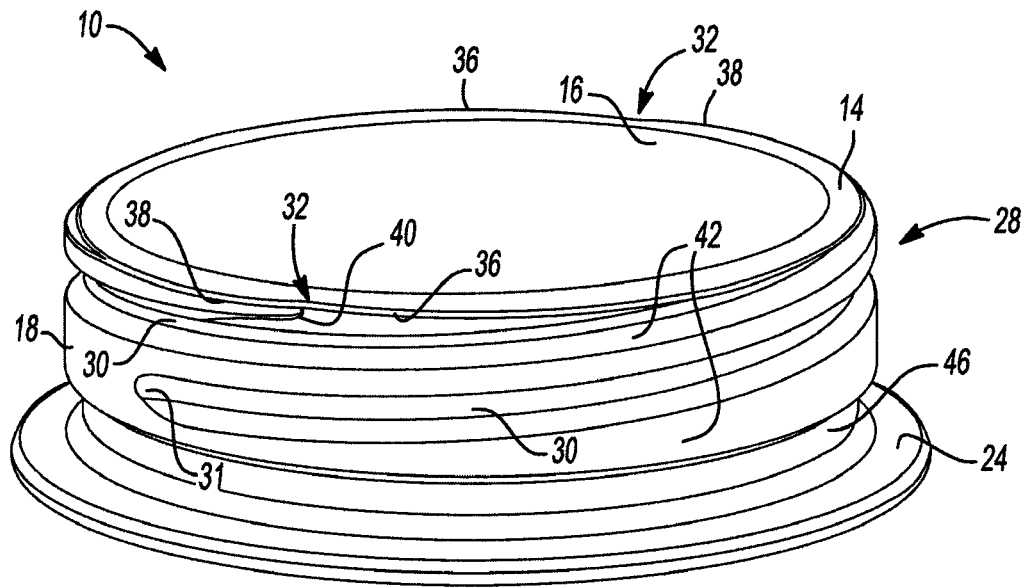
FIG. 1 is a perspective view of a finish of a plastic container constructed in accordance with the teachings of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container finish having a significantly reduced weight, while enhancing the interface between a closure member or cap and the container, and meeting filling line temperature and speed demands. Significant weight reductions are achieved through the elimination of material from the container wall of a standard thread profile as well as the elimination of material in other areas of the finish, which represent areas where plastic can be removed without negatively affecting the sealability function of the closure member or cap and the container.

Additionally, a by-product of the disclosed container finish is an improvement to closure function. In this regard, the disclosed finish may be less damaging to frangible connectors incorporated in tamper-evidence closures, reducing the potential for premature closure/tamper-evidence band separation during application. The smoother, more cylindrical finish disclosed provides an opportunity to keep an applied closure member or cap more concentric with the finish, reducing the potential for uneven loading on the frangible connectors which secure the tamper-evidence band to the body of the closure member or cap. Such stability improves tamper-evidence band separation.

Traditionally, the distance between the top seal surface of a container and the start of the container's threads varies slightly during normal production. As this distance varies, it affects the rotational position of an applied closure, and thus the relative location of the tamper-evidence band retention features to the mating features on the finish. The disclosed container finish eliminates the above-mentioned distance and variability, and thereby contributes to improved tamper-evidence band closure performance.

However, in some embodiments, this distance between the top seal surface of the container and the start of the container's threads can be elongated. That is, an increased distance between the top sealing surface and the start of the container's threads can simplify the formation of the threads and further provide a smooth and consistent top sealing surface for improved sealing engagement and reliability with the cap.

With initial reference to FIGS. 1-4 and 8-10, a finish of a plastic, e.g. polyethylene terephthalate (PET), hot-fillable container is shown and generally identified at reference numeral 10. A closure member or cap 12 (FIG. 7, described in detail later) may be used to selectively mate with the finish 10 in a closed or assembled position. The finish 10 of the present teachings includes a top 14 defining a mouth or opening 16, an annular sidewall 18 and a support ring 24. The opening 16 allows the plastic container to receive a commodity. The annular sidewall 18 generally defines a groove region 28. The groove region 28 provides a means for attachment of the closure member or cap 12. The groove region 28 is formed by a pair of grooves 30 generally defining a helical pattern. Each groove 30 initiates at a groove entrance 32 and sweeps gradually downward about 180 degrees to about 220 degrees around the annular sidewall 18 of the finish 10 to a terminal end 31. Accordingly, the terminal end 31 prevents over torquing of the closure member or cap 12, which could compromise the seal integrity of the closure member or cap 12 of the container. The terminal end 31 also aids in orienting the closure member or cap 12 in relation to the container.

Figure 2:
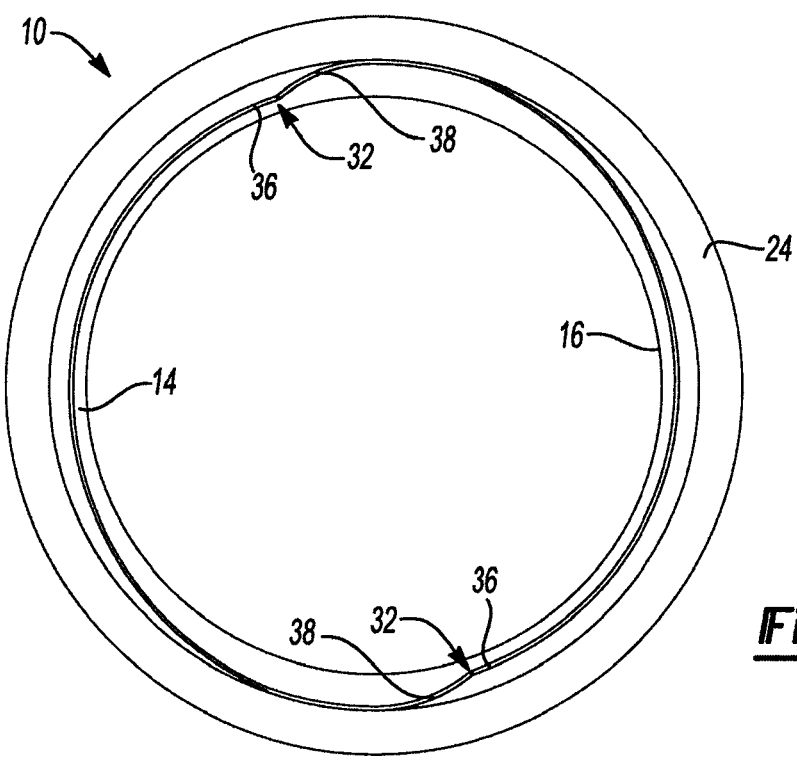
FIG. 2 is a top plan view of the finish of FIG. 1.
Figure 8:
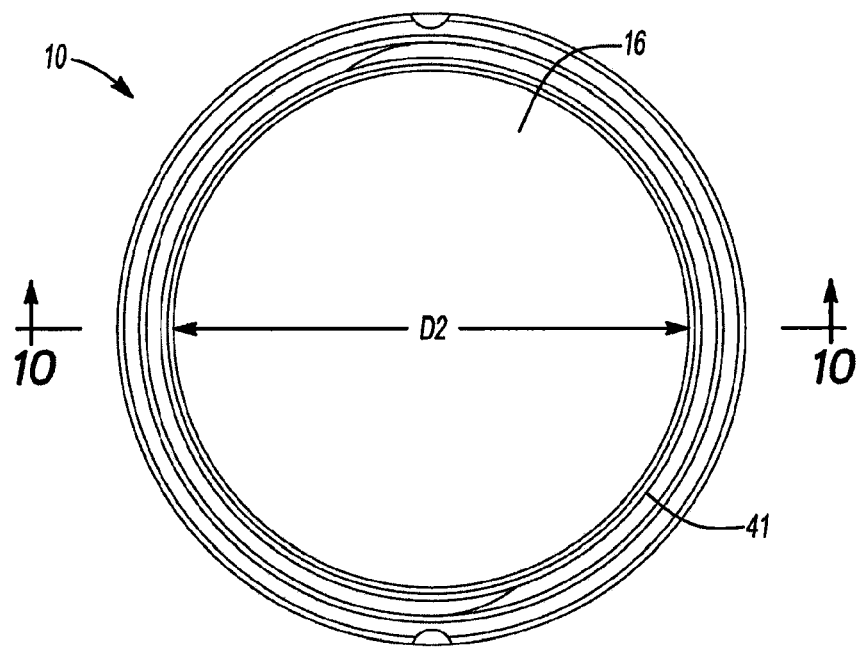
FIG. 8 is a top plan view of a finish of a plastic container constructed in accordance with some embodiments of the present disclosure.
Figure 9:
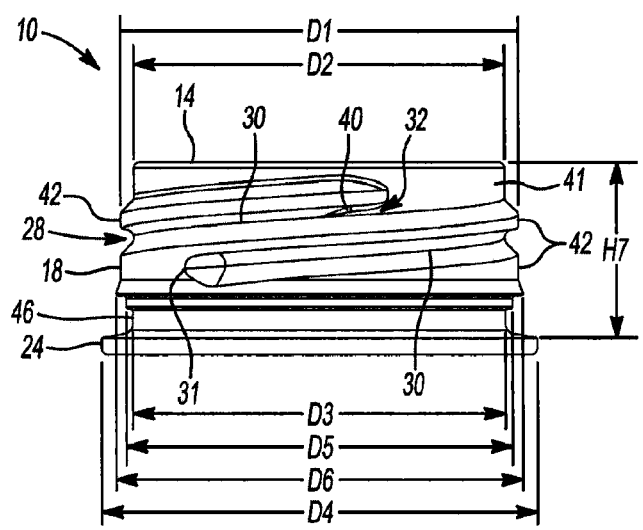
FIG. 9 is a side view of the finish of FIG. 8.
Figure 10:
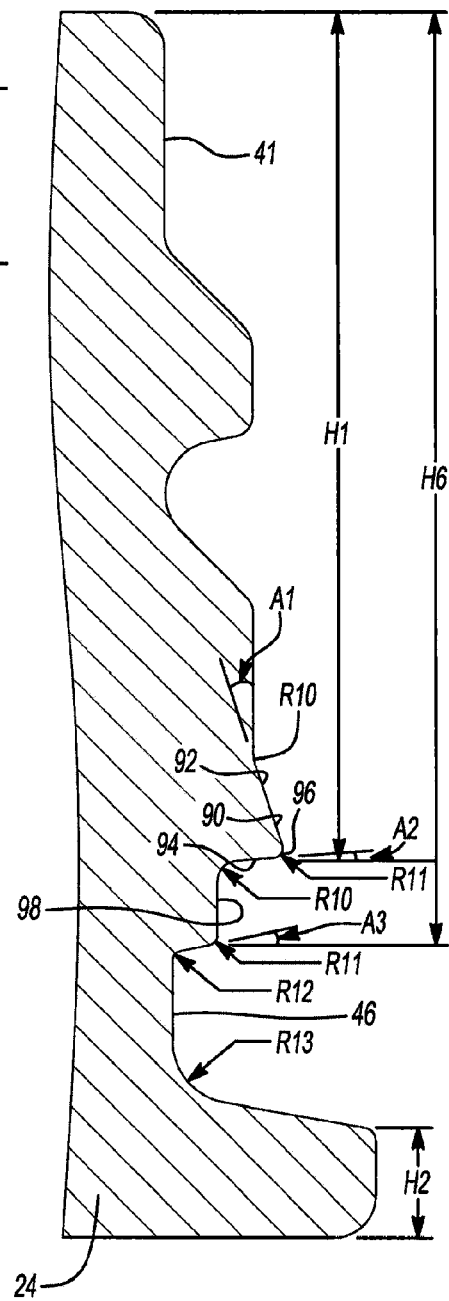
FIG. 10 is a sectional view of the finish taken along line 10-10 of FIG. 8.

In some embodiments, as illustrated in FIGS. 1-4, the groove entrance 32 is generally defined at an intersection between an inward sweeping radial lip 36 and an outward sweeping radial lip 38. As best illustrated in FIG. 2, the inward sweeping radial lip 36 defines an arcuate path having a decreasing radius in the clockwise direction. The outward sweeping radial lip 38 defines an arcuate path having an increasing radius in the clockwise direction. In some embodiments, as illustrated in FIGS. 8-10, groove entrance 32 can be spaced below top 14 a distance such that grooves 30 do not extend upward and bisect top 14 but rather define a collar space 41 (FIGS. 9 and 10). In this way, collar space 41 can lead into groove 30 and eliminate the need for inwardly sweeping radial lip 36. Collar space 41 can define an outer diameter sufficient to permit engagement of threads on cap 12 with grooves 30. That is, in some embodiments employing identical caps 12, collar space 41 can define an outer diameter D2 (FIG. 9).

A ramp 40 (FIGS. 1 and 9) is defined at the groove entrance 32 and leads into the respective grooves 30. In another example, the top 14 may define a constant outer radius without incorporating the inward and outward sweeping radial lips 36 and 38, respectively (FIGS. 8-10). It is appreciated that a single groove, or two or more grooves, may be provided on the annular sidewall 18. Lands 42 define surfaces formed between the grooves 30 on the annular sidewall 18.

A radial channel 46 is formed between the annular sidewall 18 and the support ring 24. As will be described in greater detail later, the radial channel 46 may serve as a means for capturing a break-away, tamper-evidence (TE) band 47 attached to the closure member or cap 12. It is appreciated that the radial channel 46 may also include notches, ratchets or similar geometry for dislodging the break-away, TE band 47 of the closure member or cap 12 during the opening of the container. In another example, the grooves 30 can extend all the way into the radial channel 46 effectively eliminating any terminal end of the grooves 30 (i.e. terminal end 31 discussed above).

In some embodiments, as illustrated in FIGS. 8-10, radial channel 46 and annular sidewall 18 can comprise a small lip or kick out feature 90. Kick out feature 90, in some embodiments, can comprise an outwardly sloped ramp portion 92 extending from annular sidewall 18 down to an undercut surface 94 terminating within radial channel 46. In this regard, an outer diameter of ramp portion 92, at its distal end 96, will be greater than a diameter of annular sidewall 18. It should be appreciated that kick out feature 90 provides improved engagement of TE band 47, while minimizing sidewall thickness, material waste, and/or container weight.

Still referring to FIGS. 9 and 10, radial channel 46 can comprise a stabilizer portion 98. In some embodiments, stabilizer portion 98 can extend about finish 10 or, in some embodiment, can be generally contained at localized portions about finish 10. Stabilizer portion 98 can provide an outer diameter sufficient to stabilize TE band 47 to generally prevent or minimize the chance of TE band 47 becoming axially offset relative to finish 10 and walking or otherwise disengaging kick out feature 90, without unnecessarily adding to sidewall thickness, material waste, and/or container weight. Moreover, the reduced diameter portion of radial channel 46 can be sized to closely conform to sizing requirements for later blow molding. In this way, a gripper member of the blow molding system can reliably engage the reduced diameter portion for proper handling while stabilizer portion 98 can be sized to maximize the performance of TE band 47.

The pair of grooves 30 of the finish 10 each defines a debossed (grooved) threaded profile around the annular sidewall 18. When compared to traditional injection molded finishes having an embossed (raised) threaded profile, the finish 10 of the present disclosure may represent a material savings in overall container weight. The present disclosure is particularly useful in hot-fill applications where thicker, heavier finishes have been required to withstand the heat generated from hot-fill processes thereby allowing for traditional opening diameters and finish wall thicknesses to be maintained while significantly light weighting the container. Thus, the disclosed finish 10 is capable of withstanding the rigors associated with hot-fill processes, resulting in the same or less distortion as is found in traditional container designs having thicker, heavier finishes.

In another advantage over traditional threaded finish containers, a finish 10 having grooves 30 or collar space 41 is more comfortable for a user's mouth to engage and therefore drink from. In this way, a user's mouth can rest more comfortably on a finish free of projecting threads. Furthermore, it is easier for a user to form a seal between their mouth and the finish 10 having grooves 30 or collar space 41 as compared to a finish having projecting threads.

A plastic container may be designed to retain a commodity during a thermal process, typically a hot-fill process. For hot-fill bottling applications, bottlers generally fill the container with a liquid or product at an elevated temperature between approximately 155° F. to 205° F. (approximately 68° C. to 96° C.) and seal the container at the finish 10 with the closure member or cap 12 before cooling. In addition, the plastic container may be suitable for other high-temperature pasteurization or retort filling processes or other thermal processes as well.

Figure 3:
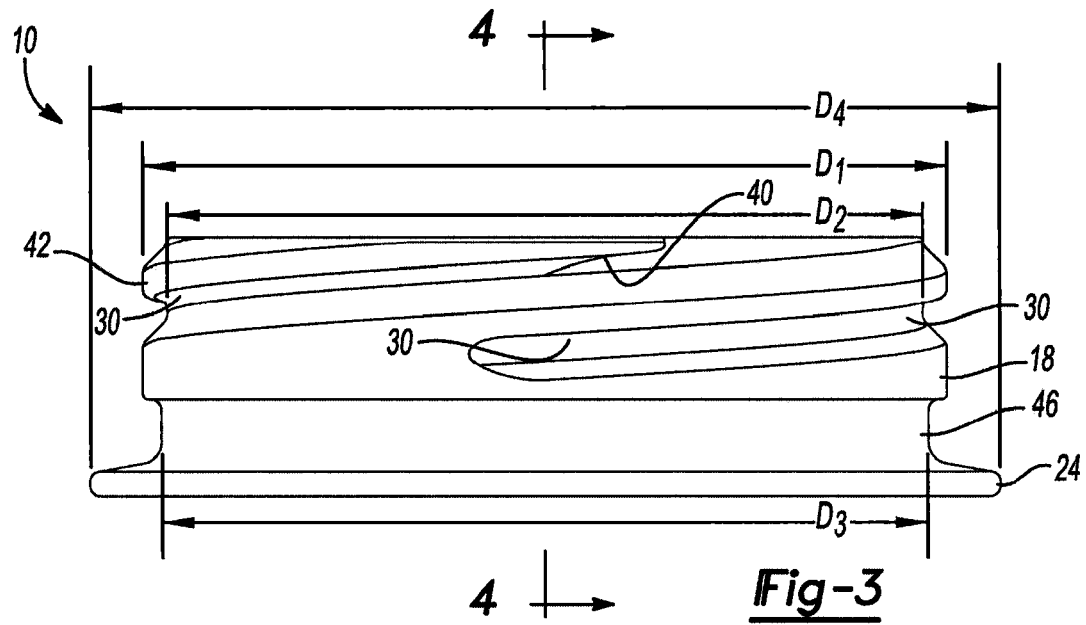
FIG. 3 is a side view of the finish of FIG. 1.
Figure 4:
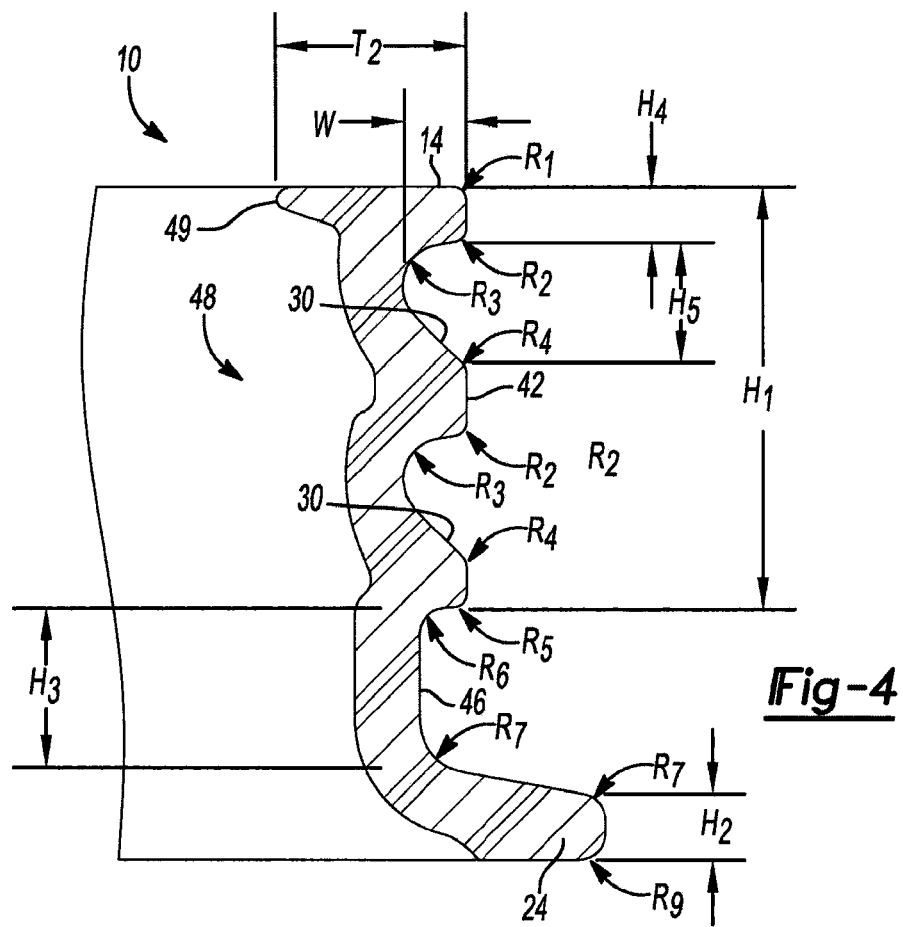
FIG. 4 is a sectional view of the finish taken along line 4-4 of FIG. 3.

Turning now to FIGS. 3 and 4, exemplary dimensions for the finish 10 will be described. It is appreciated that other dimensions may be used. A diameter D1 of the finish 10 taken at the lands 42 of the annular sidewall 18 may be 62.08 mm (2.44 inches). A diameter D2 of the finish 10 taken at the grooves 30 of the annular sidewall 18 may be 59.99 mm (2.36 inches). Accordingly, the diameter D2 may be at least 1.0 mm (0.04 inch) less than the diameter D1. A diameter D3 of the finish 10 taken at the radial channel 46 may be 59.99 mm (2.36 inches). Similarly, the diameter D3 may be at least 1.0 mm (0.04 inch) less than the diameter D1. As such, the diameter D2 and the diameter D3 may be less than the diameter D1. A diameter D4 of the finish 10 taken at the support ring 24 may be 65.98 mm (2.60 inches). As a result of the reduction in the cap diameter, the diameter D4 is similarly reduced. A height H1 taken from the top 14 to the beginning of the radial channel 46 may be 13.21 mm (0.52 inch). A height H2 of the support ring 24 may be 1.27 mm (0.05 inch). A height H3 of the radial channel 46 may be 4.45 mm (0.18 inch). A height H4 taken from the top 14 to the first groove 30 at the completion of the ramp 40 may be 1.09 mm (0.04 inch). A height H5, or a height of the groove 30, may be 2.39 mm (0.09 inch). A height of the land 42, may be 1.20 mm (0.05 inch). A groove depth W may be 1.19 mm (0.05 inch). In this regard, the groove depth W may not be greater than about 50% to about 60% of a wall thickness T2 taken from land 42 to the inner diameter of the opening 16.

With continued reference to FIG. 4, various radii will now be listed with exemplary dimensions. R1, R2, R4 and R5 may be 0.25 mm (0.01 inch). R3 may be 0.76 mm (0.03 inch). R6, R8 and R9 may be 0.51 mm (0.02 inch). R7 may be 1.02 mm (0.04 inch). As such, a minimum dimension for R1, R2, R4, R5, R6, R7 and R9 may be 0.1 mm (0.004 inch). As shown in FIG. 4, an inner diameter 48 of the finish 10 can define a non-uniform cross-section as a result of the blow-molding process. Again, it is appreciated that other dimensions may be used. However, the above-described dimensions provide the closure member or cap 12 with good spin capabilities when engaging the grooves 30.

Turning now to FIGS. 9 and 10, exemplary dimensions for additional embodiments of finish 10 will be described. It is appreciated that other dimensions may be used. A diameter D1 of the finish 10 taken at the lands 42 of the annular sidewall 18 may be 34.79 mm (1.37 inches). A diameter D2 of the finish 10 taken at the grooves 30 of the annular sidewall 18 may be 32.41 mm (1.28 inches). Accordingly, the diameter D2 may be at least 1.0 mm (0.04 inch) less than the diameter D1. A diameter D5 of the finish 10 taken at the stabilizer portion 98 of radial channel 46 may be 33.81 mm (1.33 inches). Similarly, the diameter D5 may be about 1.0 mm (0.04 inch) less than the diameter D1. As such, the diameter D2 and the diameter D5 may be less than the diameter D1. A diameter D4 of the finish 10 taken at the support ring 24 may be 38.09 mm (1.50 inches). As a result of the reduction in the cap diameter, the diameter D4 is similarly reduced. A diameter D3 of the radial channel 46 may be 32.61 mm (1.28 inches). Diameter D3 can be less than the diameter D5 for reduced material usage and improved molding. A diameter D6 of the kick out feature 90 may be 35.61 mm (1.40 inches). As a result, diameter D6 can be greater than diameter D1.

A height H1 taken from the top 14 to the beginning of the radial channel 46 (i.e. undercut surface 94) may be 11.43 mm (0.41 inch). A height H2 of the support ring 24 may be 1.44 mm (0.06 inch). A height H6 taken from the top 14 to the bottom of stabilizer portion 98 may be 12.66 mm (0.50 inch). A height H7 taken from the top 14 to about the bottom of radial channel 46 may be 14.86 mm (0.59 inch).

With continued reference to FIG. 10, various radii will now be listed with exemplary dimensions. R10 may be 0.25 mm (0.01 inch). R11 may be 0.1 mm (0.004 inch). R12 may be 0.15 mm (0.006 inch). R13 may be 0.8 mm (0.031 inch). Finally, various angles can be defined, such as A1 may be 18° 30', A2 may be 2°, and A3 may be 10°. Again, it is appreciated that other dimensions may be used. However, the above-described dimensions provide the closure member or cap 12 with good spin capabilities when engaging the grooves 30.

Figure 5:
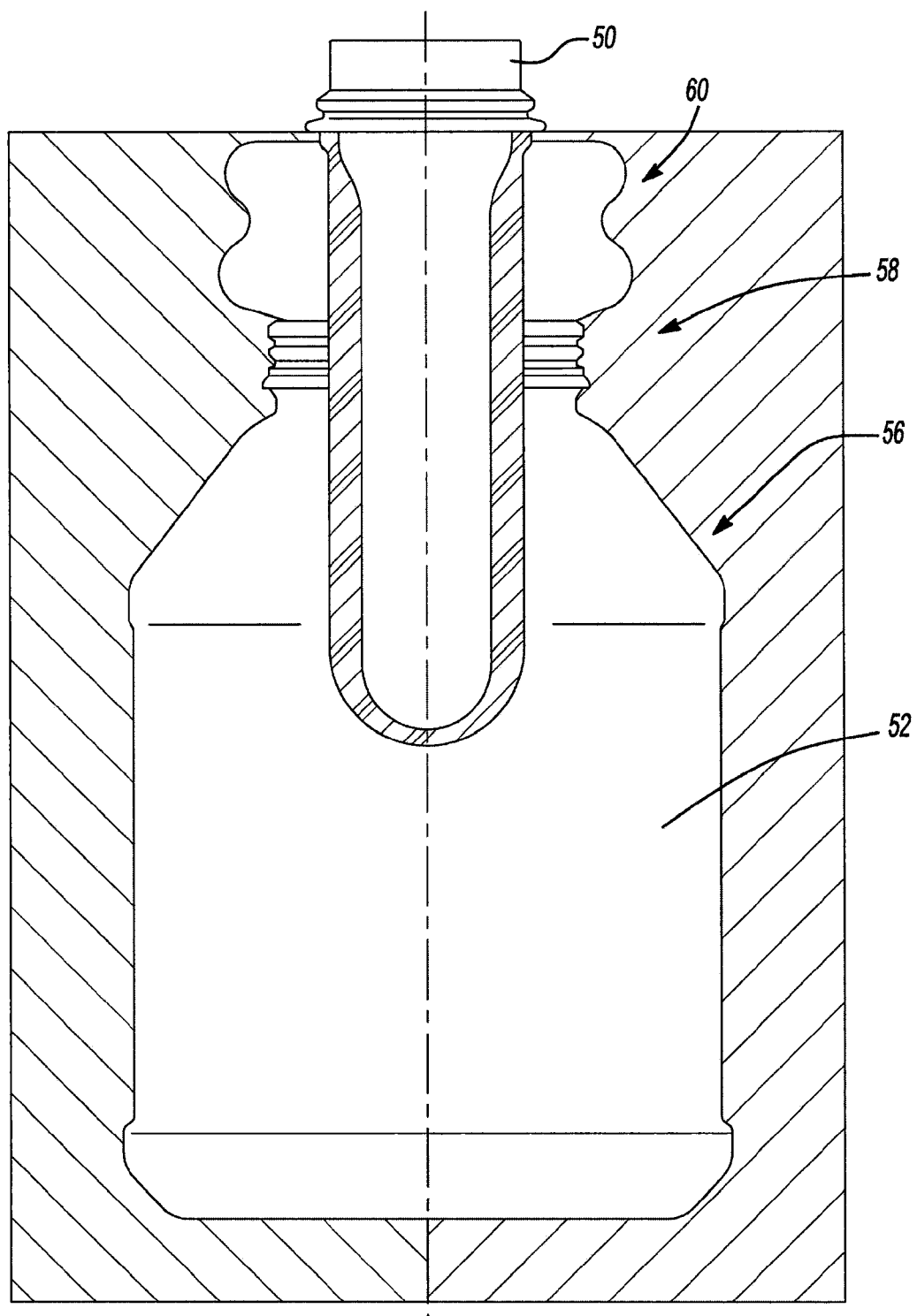
FIG. 5 is a sectional view of an exemplary mold cavity used during formation of the container having the finish of FIG. 1 and shown with a preform positioned therein.
Figure 6:
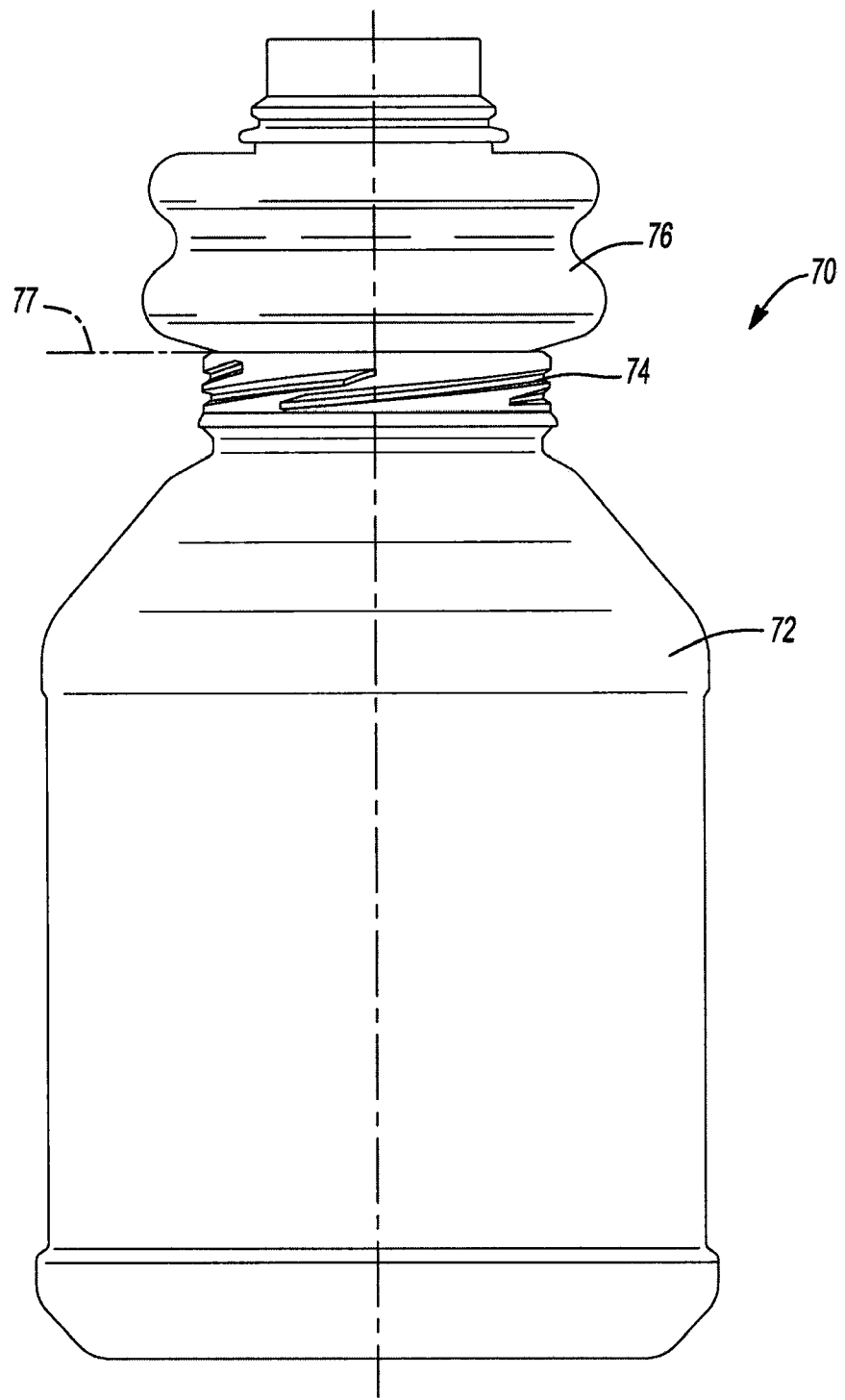
FIG. 6 is a side elevational view of an intermediate container formed by the mold cavity of FIG. 5.

Turning now to FIGS. 5 and 6, a preform 50 used to mold an exemplary container having the finish 10 will be described. It should be appreciated that although finish 10 of FIGS. 1-4 is illustrated, the finish 10 of FIGS. 8-10 is similarly molded. The plastic container of the present teachings is a blow molded, biaxially oriented container with a unitary construction from a single or multi-layer material. A well-known stretch-molding, heat-setting process for making hot-fillable plastic containers generally involves the manufacture of the preform 50 through injection molding of a polyester material, such as polyethylene terephthalate (PET), having a shape well known to those skilled in the art similar to a test-tube with a generally cylindrical cross section and a length typically approximately fifty percent (50%) that of the resultant container height.

Turning now specifically to FIG. 5, an exemplary method of forming the container will be described. At the outset, the preform 50 may be placed into the mold cavity 52. In general, the mold cavity 52 has an interior surface corresponding to a desired outer profile of the blown container. More specifically, the mold cavity 52 according to the present teachings defines a body forming region 56, a finish forming region 58 and a moil forming region 60. The resultant structure, hereinafter referred to as an intermediate container 70, as illustrated in FIG. 6, generally includes a body 72, a finish 74 and a moil 76.

In one example, a machine (not illustrated) places the preform heated to a temperature between approximately 190° F. to 250° F. (approximately 88° C. to 121° C.) into the mold cavity 52. The mold cavity 52 may be heated to a temperature between approximately 250° F. to 350° F. (approximately 121° C. to 177° C.). A stretch rod apparatus (not illustrated) stretches or extends the heated preform 50 within the mold cavity 52 to a length approximately that of the intermediate container 70 thereby molecularly orienting the polyester material in an axial direction generally corresponding with a central longitudinal axis of the resultant container. While the stretch rod extends the preform 50, air having a pressure between 300 PSI to 600 PSI (2.07 MPa to 4.14 MPa) assists in extending the preform 50 in the axial direction and in expanding the preform 50 in a circumferential or hoop direction thereby substantially conforming the polyester material to the shape of the mold cavity 52 and further molecularly orienting the polyester material in a direction generally perpendicular to the axial direction, thus establishing the biaxial molecular orientation of the polyester material in most of the intermediate container 70. The pressurized air holds the mostly biaxial molecularly oriented polyester material against the mold cavity 52 for a period of approximately two (2) to five (5) seconds before removal of the intermediate container 70 from the mold cavity 52.

In another example, a machine (not illustrated) places the preform 50 heated to a temperature between approximately 185° F. to 239° F. (approximately 85° C. to 115° C.) into the mold cavity 52. The mold cavity 52 may be chilled to a temperature between approximately 32° F. to 75° F. (approximately 0° C. to 24° C.). A stretch rod apparatus (not illustrated) stretches or extends the heated preform 50 within the mold cavity 52 to a length approximately that of the intermediate container 70 thereby molecularly orienting the polyester material in an axial direction generally corresponding with a central longitudinal axis of the resultant container. While the stretch rod extends the preform 50, air having a pressure between 300 PSI to 600 PSI (2.07 MPa to 4.14 MPa) assists in extending the preform 50 in the axial direction and in expanding the preform 50 in a circumferential or hoop direction thereby substantially conforming the polyester material to the shape of the mold cavity 52 and further molecularly orienting the polyester material in a direction generally perpendicular to the axial direction, thus establishing the biaxial molecular orientation of the polyester material in most of the intermediate container 70. The pressurized air holds the mostly biaxial molecularly oriented polyester material against the mold cavity 52 for a period of approximately two (2) to five (5) seconds before removal of the intermediate container 70 from the mold cavity 52. This process is utilized to produce containers suitable for filling with product under ambient conditions or cold temperatures.

Alternatively, other manufacturing methods using other conventional materials including, for example, polypropylene, high-density polyethylene, polyethylene naphthalate (PEN), a PET/PEN blend or copolymer, and various multi-layer structures may be suitable for the manufacture of plastic containers. Those having ordinary skill in the art will readily know and understand plastic container manufacturing method alternatives.

Once the intermediate container 70 has been formed, it may be removed from the mold cavity 52. As can be appreciated, the intermediate container 70 defines the resultant container and the moil 76 prior to formation of the opening 16 (FIG. 1). An intersection between the finish 74 and the moil 76 defines a cutting plane 77 (FIG. 6). The moil 76 is subsequently severed from the finish 74 at the cutting plane 77. Thereafter, top 14 includes an inwardly extending flange member 49 (FIG. 4). Accordingly, once the moil 76 has been severed, the finish 74 becomes the finish 10. The severing process may be any suitable cutting procedure that removes the moil 76 and creates the opening 16.

Figure 7:
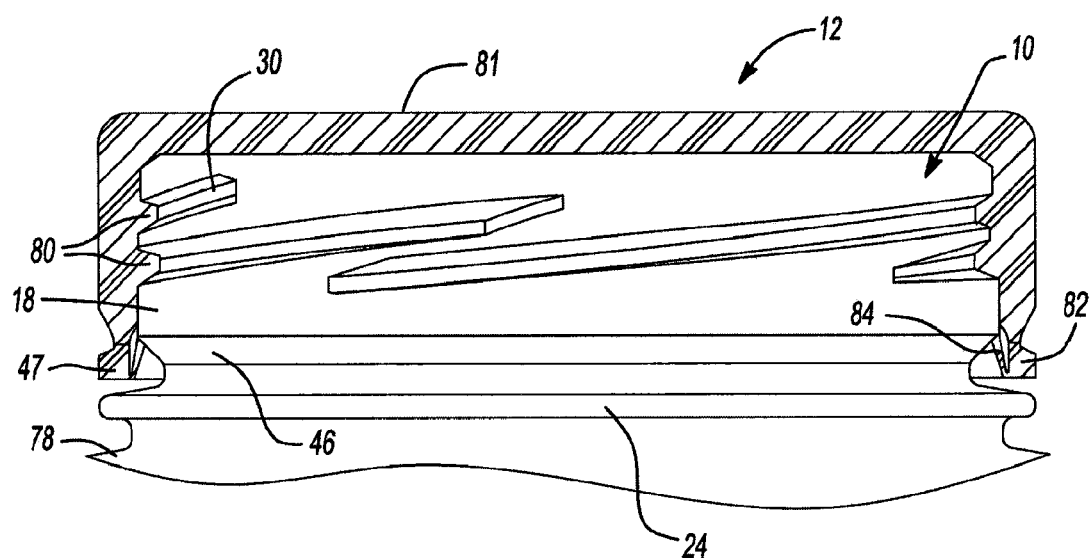
FIG. 7 is a sectional view of a closure member or cap having a tamper-evidence band and constructed in accordance with the teachings of the present disclosure, the cap shown assembled onto the container finish shown in FIG. 1.

With reference to FIG. 7, the closure member or cap 12 is shown engaged to the finish 10 in a closed or assembled position. In the assembled position, the closure member or cap 12 engages the finish 10 to preferably provide a hermetical seal to a plastic container 78. The closure member or cap 12 is preferably of a plastic or metal material suitable for subsequent thermal processing, including high temperature pasteurization and retort. According to the present teachings, the closure member or cap 12 may define raised, outwardly extending threads 80 for rotatably engaging the grooves 30 of the finish 10. In the exemplary finish 10, a two lead configuration is shown. As such, a pair of threads 80 defined on the closure member or cap 12 is adapted to be received by the complementary pair of grooves 30. While two threads 80 are shown in the sectional view of FIG. 7, it is appreciated that one or more than two threads may be provided. To initiate gripping of the threads 80 within the respective grooves 30, the closure member or cap 12 may be placed on the top 14 and rotated until both leads of threads 80 are accepted at the groove entrance 32. The ramp 40 (FIG. 1) progressively directs the respective threads 80 within the grooves 30 as the closure member or cap 12 is rotated in a clockwise direction. As explained above, each of the grooves 30 are defined around approximately 180 degrees to approximately 220 degrees of the annular sidewall 18. To rotate the closure member or cap 12 into a sealed position with the finish 10, the closure member or cap 12 may not need to rotate the entire 180 to 220 degrees. In one example, the threads 80 of the closure member or cap 12 may rotate approximately 160 degrees to approximately 200 degrees around the grooves 30 to attain a sealed position. In other words, each of the embossed (raised) threads 80 of the closure member or cap 12 may be lesser in length than each of the respective grooves 30 of the finish 10. Additionally, the threads 80 of the closure member or cap 12 may be longer than or the same in length as each of the respective grooves 30 of the finish 10 in order to orient the closure member or cap 12 in relation to the container 78. The finish 10, having debossed (inward) grooves 30 of the current disclosure, enables use of a closure member or cap 12 being shorter in height and smaller in diameter than caps currently used with traditional finishes of the same diameter having embossed (raised) threads. In one example, an outer diameter of the closure member or cap 12 can be reduced to about 41 mm (1.61 inches) as compared to a 43 mm (1.69 inches) outer diameter required for an equivalent conventional cap having grooves. Furthermore, as illustrated in FIG. 7, the outer diameter of the closure member or cap 12 can be substantially equivalent to an outer diameter defined at the support ring 24. This represents a significant weight savings, as less material is required for the closure member or cap 12. Accordingly, the finish 10 provides the container 78 with the ability to retain the closure member or cap 12, and withstand the associated application torque while also providing easy removal of the closure member or cap 12.

The closure member or cap 12 is shown with the tamper-evidence (TE) band 47. The closure member or cap 12 can generally include a cover 81 at an upper end. The TE band 47 is further defined by a band body 82 and a flap 84 extending therefrom. The flap 84 extends generally inboard of the band body 82. The TE band 47 of the closure member or cap 12 is designed to ride over the annular sidewall 18 of the finish 10 (and/or outwardly sloped ramped portion 92) in a forward (downward) direction when the closure member or cap 12 is initially applied to the container 78. When the closure member or cap 12 is initially unscrewed (moved upward), the flap 84 engages the annular sidewall 18 and/or undercut surface 94 of outwardly sloped ramped portion 92 and therefore breaks away the TE band 47 from the closure member or cap 12. The prevention of the TE band 47 moving back up on the finish 10 when the closure member or cap 12 is removed thus creates the necessary engagement interface and force that effectively removes the TE band 47 from the closure member or cap 12, leaving it on the container finish 10.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A plastic container assembly comprising:
   a blow-molded plastic container comprising:
   a finish having a first radial sidewall and formed at an opening into said container;
   at least one groove formed in an outer diameter of said first radial sidewall, said at least one groove sloping gradually away from said opening and being spaced apart from said opening to define a collar portion; and
   a kick out portion extending from said finish, a diameter of said kick out portion being greater than a diameter of said at least one groove; and
   a closure member adapted to selectively mate with said first radial sidewall of said container, said closure member comprising:
   a lower portion defining a closure opening;
   an upper portion defining a cover; and
   a second radial sidewall extending between said lower portion and said upper portion, said second radial sidewall having an inner surface defined in part by at least one thread formed thereon, said at least one thread adapted to cooperatively engage said at least one groove in an assembled position.

2. The blow-molded plastic container assembly of claim 1 wherein said second radial sidewall further includes a tamper-evidence band.

3. The blow-molded plastic container assembly of claim 2 wherein each of said at least one groove initiates at a groove entrance and slopes gradually downward about 180 degrees to about 220 degrees around said first radial sidewall.

4. The blow-molded plastic container assembly of claim 2 wherein said kick out portion is engagable with said tamper-evidence band to capture and break off said tamper-evidence band upon an initial removal of said closure member from the container.

5. The blow-molded plastic container assembly of claim 1 wherein each of said at least one thread initiates at a thread entrance and slopes gradually toward said cover about 160 degrees to about 200 degrees around said second radial sidewall.

6. The blow-molded plastic container assembly of claim 1 wherein said closure member is formed of one of a plastic and metal material suitable for thermal processing.

7. A blow-molded plastic container having an upper portion, a body portion extending from said upper portion to a base, said base closing off an end of said container; said upper portion, said body portion and said base cooperating to define a receptacle chamber within said container into which product can be filled, said blow-molded plastic container comprising:
   a mouth formed in said upper portion defining an opening into the container; and
   a radial sidewall of said upper portion defined in part by at least one groove formed in an outer diameter of said radial sidewall, said at least one groove sloping gradually downward from a groove entrance along said radial sidewall and away from said opening, said radial sidewall also including a ramp defined at said groove entrance to lead into the respective groove, said radial sidewall also defined by an outwardly sloped ramp portion that is disposed below said at least one groove, said outwardly sloped ramp portion having a diameter greater than a diameter of said radial sidewall.

8. The blow-molded plastic container of claim 7 wherein said upper portion further comprises:
   a radial channel formed adjacent to a lower portion of said radial sidewall and below said outwardly sloped ramp portion.

9. The blow-molded plastic container of claim 8 wherein the container has a longitudinal axis, wherein each of said at least one groove has a depth measured perpendicular to the longitudinal axis from an adjacent land, the depth being at most about 50% to about 60% of a wall thickness, the wall thickness being measured perpendicular to the longitudinal axis, the wall thickness being measured from the adjacent land to an inner diameter of said opening.

10. The blow-molded plastic container of claim 8 wherein said radial channel comprises a stabilizer portion having a diameter greater than a remaining portion of said radial channel.

11. The blow-molded plastic container of claim 7 wherein each of said at least one groove initiates at said groove entrance and slopes gradually downward about 180 degrees to about 220 degrees around said radial sidewall.

12. The blow-molded plastic container of claim 11 wherein said groove entrance is spaced apart from said mouth to form a collar portion.

13. The blow-molded plastic container of claim 12 wherein said collar portion defines a constant diameter terminating at said mouth.

14. A blow-molded plastic container configured for closure by a cap, the container comprising:
   a body portion extending from an upper portion to a base;
   a finish formed at said upper portion, said finish configured for removable attachment with the cap, said finish having a radial sidewall and an undercut surface engagable with a tamper-evidence band of the cap, said finish defined in part by at least one groove formed in said radial sidewall; and
   a moil portion extending from said finish in an opposite direction from said body portion, said moil portion adapted to be severed from said finish to define an opening into the container that is configured to be closed by the cap.

15. The blow-molded plastic container of claim 14 wherein each of said at least one groove initiates at a groove entrance and slopes gradually downward about 180 degrees to about 220 degrees around said radial sidewall.

16. The blow-molded plastic container of claim 15 wherein said finish includes a top that defines a mouth, and wherein said groove entrance is spaced apart from said mouth to form a collar portion.

17. The blow-molded plastic container of claim 16 wherein said collar portion defines a constant diameter terminating at said mouth.

18. The blow-molded plastic container of claim 16 wherein said upper portion further comprises a radial channel formed adjacent to a lower portion of said radial sidewall and below said undercut surface.

19. The blow-molded plastic container of claim 18 wherein said radial channel comprises a stabilizer portion having a diameter greater than a remaining portion of said radial channel.

* * * * *

UNITED STATES PATENT AND TRADEMARK OFFICE
CERTIFICATE OF CORRECTION

PATENT NO. : 8,413,829 B2
APPLICATION NO. : 12/690556
DATED : April 9, 2013
INVENTOR(S) : Michael E. Penny Page 1 of 1

It is certified that error appears in the above-identified patent and that said Letters Patent is hereby corrected as shown below:

Title Page, item (54), and in the specification, column 1, line 3, title, delete "TAMPER EVIDENT" and insert --TAMPER-EVIDENT--.

In the Specifications:

Column 7, line 65, delete "Dl" and insert --D1--.

Column 8, line 50, before "heated", insert --50--.

Signed and Sealed this
Sixth Day of August, 2013

Teresa Stanek Rea
*Acting Director of the United States Patent and Trademark Office*